US006254939B1

(12) United States Patent
Cowan et al.

(10) Patent No.: US 6,254,939 B1
(45) Date of Patent: Jul. 3, 2001

(54) METHOD FOR COATING AN ELECTRICAL CONTACT WITH A GEL SEALANT

(75) Inventors: Douglas Lewis Cowan, Snellville, GA (US); David Stevens Kerr, Morris Plains, NJ (US); Ivan Pawlenko, Holland, PA (US); Anthony Robert Tancreto, Brooklyn, NY (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 09/126,291

(22) Filed: Jul. 30, 1998

(51) Int. Cl.[7] .......... C08J 7/04

(52) U.S. Cl. .......... 427/510; 427/58; 427/123; 427/287; 427/348; 427/385.5; 427/387; 427/421

(58) Field of Search .......... 427/510, 58, 512, 427/515, 558, 559, 595, 123, 385.5, 387, 421, 287, 348

(56) References Cited

U.S. PATENT DOCUMENTS

| | | | | |
|---|---|---|---|---|
| 3,953,626 | * | 4/1976 | Suzuki et al. | 427/346 |
| 5,246,383 | | 9/1993 | Shimirak et al. . | |
| 5,260,094 | * | 11/1993 | Giannelis et al. | 427/79 |

* cited by examiner

*Primary Examiner*—Bernard Pianalto
(74) *Attorney, Agent, or Firm*—Lowenstein Sandler PC

(57) ABSTRACT

A method for environmentally sealing an electrical contact including spraying a curable gel sealant in an uncured fluid form onto all exposed surfaces of the electrical contact and curing it to form an environmentally protective gel coating on all of the exposed surfaces of the contact. In another embodiment of the method, at least one bead of the curable gel sealant in its fluid form is deposited onto an electrical contact and spread across all exposed surfaces of the contact with a stream of air directed against the bead of the sealant. The sealant is then cured to form an environmentally protective gel coating on all of the exposed surfaces of the contact.

20 Claims, 2 Drawing Sheets

METHOD FOR COATING AN ELECTRICAL CONTACT WITH A GEL SEALANT

FIELD OF THE INVENTION

This invention relates to electrical contacts, and in particular, to a method for coating an electrical contact with a gel sealant.

BACKGROUND OF THE INVENTION

Electrical connectors are used in various types of electronic equipment such as telephone communication equipment and computers. One type of electrical connector is an RJ11 type plug and socket connector commonly used for telephone line connections at subscriber locations. The plug includes metal electrical contacts which engage metal electrical contacts in the socket.

It is desirable that the electrical contacts of the connectors be environmentally sealed or protected because they are susceptible to failure from corrosion caused by exposure to moisture, corrosives and other contaminants. This is typically accomplished by filling the connector with an environment sealant. The sealant typically comprises a hydrophobic dielectric gel or grease, in order to exclude or block moisture from the contacts. The use of such a sealant significantly increases the reliability of the contacts.

Unfortunately, environmentally sealing the electrical contacts increases the cost of the connectors. Gel filling typically requires a gel filling fixture because the commonly used gel sealants are fluid in the uncured state and difficult to contain properly within the connector. Such fixturing typically comprises a mold cavity specifically shaped for receiving the connector. The connector is placed into the mold cavity and filled with the uncured gel to cover the electrical contacts. The gel is cured and the connector is removed from the mold cavity.

Connectors filled with gels or greases can also become messy and difficult to handle when coupled to a corresponding connector. This is because the gel contained within the connector is displaced to the outside of the connector. Although some connectors include a resilient diaphragm that contains the displaced gel, this additional component increases the cost of the connector.

SUMMARY

A method for environmentally sealing an electrical contact comprises spraying a curable gel sealant in an uncured fluid form onto all exposed surfaces of the electrical contact and curing it to form an environmentally protective gel coating on all of the exposed surfaces of the contact.

Another embodiment of the method comprises depositing at least one bead of a curable gel sealant in an uncured fluid form onto an electrical contact and spreading it across all exposed surfaces of the contact with a stream of air directed against the bead of the sealant. The sealant is then cured to form an environmentally protective gel coating on all of the exposed surfaces of the contact.

BRIEF DESCRIPTION OF THE DRAWINGS

The advantages nature and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not the scale.

DETAILED DESCRIPTION OF THE INVENTION

Figure 1:
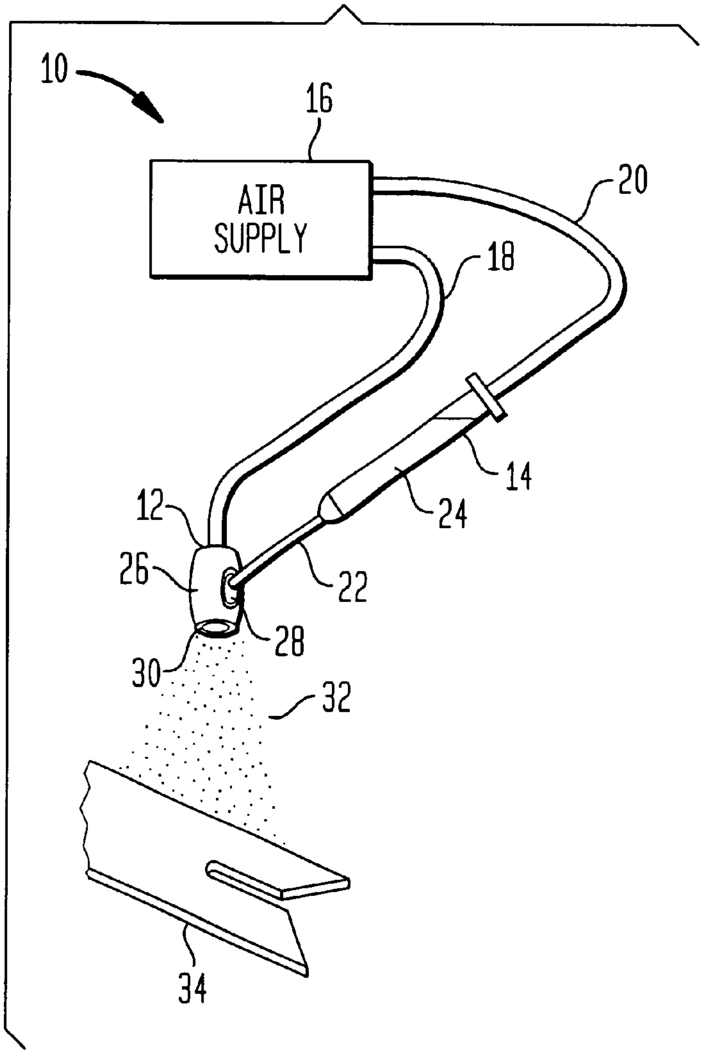
FIGS. 1–3 are diagrammatic views illustrating a first method for coating an electrical connector.

FIG. 1 shows an exemplary apparatus 10 for carrying out a method for coating a metallic electrical contact such as typically used in electrical connectors and terminals. The apparatus 10 comprises an atomizer 12 and a fluid dispenser 14 which are both coupled to an air supply 16 by a pair of air supply lines 18, 20. The fluid dispenser 14 contains a curable sealant 24 in a fluid state that forms a protective gel when cured. The dispenser 14 includes a nozzle 22 that meters an appropriate amount of the sealant 24. The dispenser 14 is positioned so that the end of the nozzle 22 is within an aperture 28 in a side wall 26 of the atomizer 12.

The sealant composition typically comprises a dielectric material such as a silicone or urethane gel. The sealant composition can also comprise a thermoplastic gel material. A wide variety of such curable sealants are available for this use and are commonly formulated as one or two component materials. These sealants are typically fluid-like in the uncured state. The two component sealants allow the viscosity of the final gel to be adjustively selected by changing the mix ratios of the components. The sealant can be formulated to cure in air, by application of heat, or with exposure to UV light.

Figure 2:
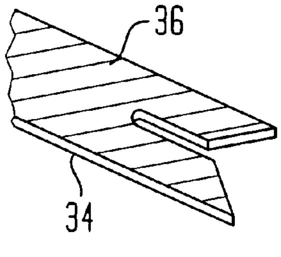

In the first step of the method, a fine spray of sealant 32 is applied to a metallic electrical contact 34. The fine spray of sealant 32 is created by applying air pressure to the dispenser 14 and the atomizer 12 at the same time. The air pressure forces the sealant 24 out through the nozzle 22 of the dispenser 14 and creates a stream of air through the atomizer 12. The nozzle 22 dispenses a stream of the sealant 24 into the air stream flowing through the atomizer. The sealant 24 mixes with the air and exits the atomizer 12 through its output orifice 30 as a fine spray 32. During spraying, the contact 34 is placed in close proximity to the output orifice 30 of the atomizer 12 and impacted with the spray of sealant 32 for a duration of time sufficient to provide a thin coating 36 of uncured sealant on all exposed sources of the contact 34 as shown in FIG. 2. As the sealant is sprayed, the contact 34 can be moved and rotated relative to the atomizer 12 (by moving and rotating the associated connector or terminal), if necessary, to insure complete coverage of the contact with the uncured coating 36 of sealant. The contact 34 can also be kept stationary and the atomizer 12 and dispenser 14 moved relative to the contact 34 to provide complete coverage thereof. This can be accomplished by mounting the atomizer and dispenser on a movable arm (not shown). It is also possible to provide a number of fixed atomizers and dispensers (not shown) pointed at the contact from different directions to achieve complete coverage of the contact with the sealant spray.

Figure 3:
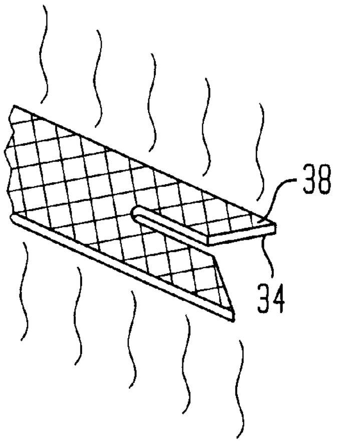

In the final step of the method as shown in FIG. 3, the wet uncured coating 36 of sealant is cured to convert it to the gel state, thereby providing a thin protective coating 38 of gel on all the exposed surfaces of the contact 34. The gel coating 38 is typically about 3 mils thick to about 10 mils thick depending upon the size of the contact, the application or need. The gel coating 38 can also be greater than 10 mils in some applications. Curing can be accomplished by exposing the contact to ambient or heated air, by applying heat to the contact (over heating), or by exposing the contact to UV light, depending upon the type of the sealant used. The gel coating 38 should have a hardness, depending upon the application or need, sufficient to provide lasting protection against environmental contaminants.

The method of the present invention minimizes the amount of gel used for environmentally sealing the electrical contact and eliminates the costly gel filling fixturing used in conventional methods. This in turn, substantially reduces the cost of the contacts or connector. The method can be used to cover various types of contacts typically used in connectors and terminals including insulation displacent contacts (as shown), square pin contacts, circular pin contacts and the contact blades of RJ11 connectors, wire-wrap connections, and the entire family of voice and data transmission connectors and connections.

Figure 4:
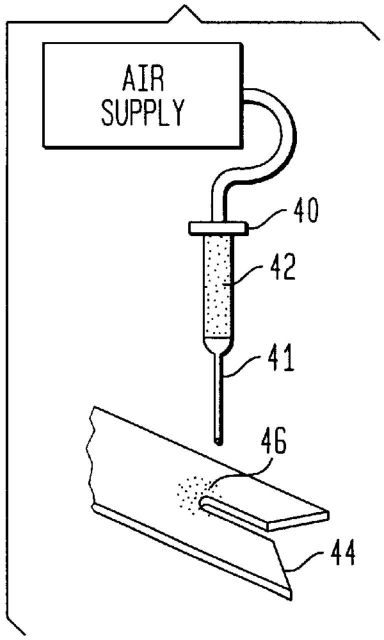
FIGS. 4–6 are diagrammatic views illustrating a second method for coating an electrical connector.
Figure 5:
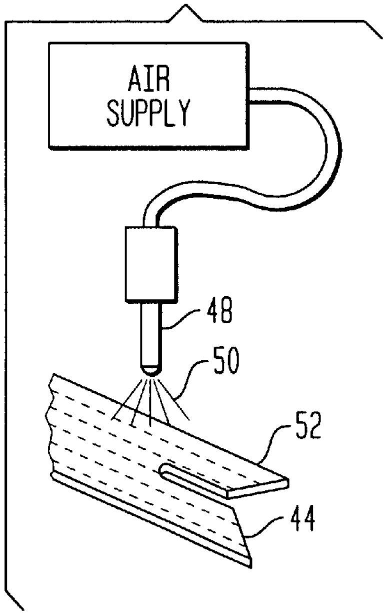
Figure 6:
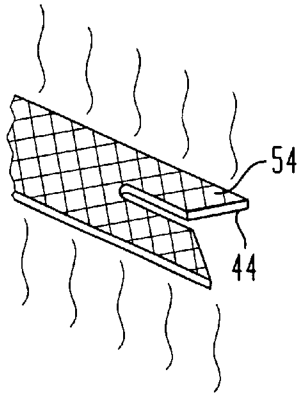

FIGS. 4–6 depict a second embodiment of the method. FIG. 4 shows the first step of the method where an metallic electrical contact 44 is positioned in close proximity to a nozzle 41 of an air powered sealant dispenser 40 similar to that described in FIG. 1. The dispenser contains a curable sealant 42 (substantially similar to that used in the method of FIGS. 1–3) in a fluid form that is curable to a protective gel. The dispenser 40 is operated for a duration of time sufficient to deposit at least one bead of sealant onto the surface of the contact 44. A second bead of sealant can be deposited on the other side of the contact if necessary.

In the next step of the method shown in FIG. 5, the contact 44 is positioned in close proximity to an air nozzle 48. The air nozzle 48 directs a stream of air 50 against the bead 46 of sealant at a pressure sufficient for spreading the bead 46 across all exposed surfaces of the contact 44. If necessary, complete spreading of the bead 46 can be achieved by moving the contact 44 relative to the air nozzle 48 or by moving the air nozzle 48 relative to the contact 44. This step produces a thin coating 52 of uncured sealant across the entire contact 44.

In the final step of the method as shown in FIG. 6, the uncured coating 52 of sealant is cured using oven heating, ambient or heated air or UV light, depending upon the sealant used, to convert it to the gel state. This provides all the exposed surfaces of the contact 44 with a thin protective coating 54 of gel. The coating 54 of gel is typically about 3 mils thick to about 10 mils or greater thick depending upon the size of the contact, the application or need.

While the foregoing invention has been described with reference to the above embodiments, various modifications and changes may be made without departing from the spirit of the present invention. Accordingly, modifications and changes such as those suggested above but not limited thereto are considered to be within the scope of the claims.

What is claimed is:

1. A method for environmentally sealing an electrical contact, the method comprising the steps of:

providing a sealant in an uncured fluid form, the sealant being curable to form an environmentally protective gel;

spraying the sealant onto all exposed surfaces of the electrical contact;

curing the sprayed sealant to form an environmentally protective gel coating on all of the exposed surfaces of the contact.

2. The method according to claim 1, wherein the gel coating has a thickness which is greater than about 3 mils.

3. The method according to claim 1, wherein the step of curing is performed by heating the contact.

4. The method according to claim 1, wherein the step of curing is performed by air drying the contact with one of ambient air and heated air.

5. The method according to claim 1, wherein the step of curing is performed by exposing the contact to ultraviolet light.

6. The method according to claim 1, wherein the gel comprises a dielectric material.

7. The method according to claim 1, wherein the gel is a silicone gel material.

8. The method according to claim 1, wherein the gel is a urethane gel material.

9. The method according to claim 1, wherein the gel comprises a thermoplastic gel material.

10. The method according to claim 1, wherein the contact is a component of an electrical connector.

11. A method for environmentally sealing an electrical contact, the method comprising the steps of:

providing a sealant in an uncured fluid form, the sealant being curable to form an environmentally protective gel;

depositing at least one bead of the sealant onto the electrical contact;

spreading the sealant across all exposed surfaces of the contact with a stream of air directed against the bead of the sealant;

curing the sealant to form an environmentally protective gel coating on all of the exposed surfaces of the contact.

12. The method according to claim 11, wherein the gel coating has a thickness of greater than about 3 mils.

13. The method according to claim 11, wherein the step of curing is performed by heating the contact.

14. The method according to claim 11, wherein the step of curing is performed by air drying the contact with one of ambient air and heated air.

15. The method according to claim 11, wherein the step of curing is performed by exposing the contact to ultraviolet light.

16. The method according to claim 11, wherein the gel comprises a dielectric material.

17. The method according to claim 11, wherein the gel is a silicone gel material.

18. The method according to claim 11, wherein the gel is a urethane gel material.

19. The method according to claim 11, wherein the gel comprises a thermoplastic gel material.

20. The method according to claim 11, wherein the contact is a component of an electrical connector.

* * * * *